United States Patent [19]

Fike

[11] Patent Number: 4,529,367
[45] Date of Patent: Jul. 16, 1985

[54] UNIVERSAL TUBELESS TIRE CURING APPARATUS

[75] Inventor: Louis T. Fike, Hacienda Heights, Calif.

[73] Assignee: Ohio Machine Company, Inc., Los Angeles, Calif.

[21] Appl. No.: 478,229

[22] Filed: Mar. 24, 1983

[51] Int. Cl.$^3$ .............................................. B29H 5/04
[52] U.S. Cl. ..................................... 425/17; 425/21; 425/24; 425/25; 425/36; 425/58
[58] Field of Search ....................... 425/17, 19, 21, 24, 425/36, 38, 51, 52, 54, 55, 56, 58

[56] References Cited

U.S. PATENT DOCUMENTS

| | | | |
|---|---|---|---|
| 2,124,345 | 7/1938 | Grange | 425/17 |
| 2,480,578 | 8/1949 | Hodges | 425/58 |
| 3,331,412 | 7/1967 | Sornsen | 425/17 |
| 3,593,764 | 7/1971 | Smith | 425/17 |
| 3,614,969 | 10/1971 | Breiner | 425/17 |
| 4,214,941 | 7/1980 | Horr et al. | 425/17 |
| 4,323,414 | 4/1982 | Severson | 425/17 |

Primary Examiner—Caleb Weston
Attorney, Agent, or Firm—Fulwider, Patton, Rieber, Lee & Utecht

[57] ABSTRACT

Apparatus usable with a tire mold for curing large off-the-road tubeless tires having varying bead-to-bead spacing. The apparatus includes a lower barrel which supports a vertically moveable adjusting and locking ring on its upper portion and a single floating sealing ring telescopically slideably carried by the lower barrel. The lower barrel and sealing ring are formed with opposed sealing rims. A tire to be cured is interposed between the sealing rims and is then inflated so as to move the floating sealing ring upwardly and form a seal between the sealing rims solely by the resistance of the beads. The tire is then deflated and the assembly positioned in a tire curing mold. Thereafter, the tire is again inflated and the curing operation takes place.

5 Claims, 4 Drawing Figures

UNIVERSAL TUBELESS TIRE CURING APPARATUS

DESCRIPTION OF THE PRIOR ART

It has been heretofore proposed to utilize curing apparatus for large off-the-road tires eliminating the necessity of sealing bands or inner tubes. Such devices utilize either one or two floating sealing rims slideably moveable over a barrel-type element. Examples are disclosed in U.S. patent application Ser. No. 208,392, filed Nov. 19, 1980, and U.S. Pat. No. 4,323,414 issued Apr. 6, 1982. A single sealing rim-type device is less expensive than a double sealing rim-type device. A major disadvantage of the single sealing rim device of the aforementioned U.S. Pat. No. 4,323,414, however, is the necessity of maintaining the tire partially inflated while the tire is positioned in the tire mold. This arrangement requires a comparatively long set-up time and also involves difficulties in arranging the various parts to obtain a satisfactory seal between the tire and its supporting assembly.

SUMMARY OF THE INVENTION

The tire curing apparatus of the present invention is less expensive than heretofore proposed double floating sealing rim devices, yet it may be set up to cure a tire in less time and with less difficulty than heretofore proposed single floating sealing rim devices.

More particularly, the tire curing apparatus of the present invention utilizes a lower barrel formed with a radially extending sealing rim, an adjusting and locking ring axially, adjustably secured to the upper portion of the lower barrel, and a floating sealing ring telescopically slideably carried by the lower barrel. The lower portion of the lower barrel and the upper portion of the floating sealing ring are formed with opposed sealing rims. The beads of a tire to be cured are first lowered over the upper barrel with the adjusting and locking ring and the floating sealing rim removed. Thereafter, the floating sealing rim is lowered onto the lower barrel until its sealing rim engages the upper tire bead. Thereafter, it is only necessary to inflate the tire to automatically effect an initial seal between the tire beads and the sealing rims. The assembly of the tire and its supporting members is then positioned within a conventional tire curing mold. The tire is again inflated with the initial seal between the tire beads and the sealing rims intact. Such seal remains effective during the tire curing operation.

The tire curing apparatus of the present invention provides for control of the bead-to-bead spacing of the tire being cured. Such control is effected by vertically adjusting the spacing between the adjusting and locking ring and the lower barrel. The upward movement of the floating sealing ring is limited by abutment with the adjusting and locking ring.

Various other advantages of the tire curing apparatus of the present invention will become apparent from the following detailed description of a preferred embodiment thereof.

DETAILED DESCRIPTION OF A PREFERRED EMBODIMENT

Figure 1:
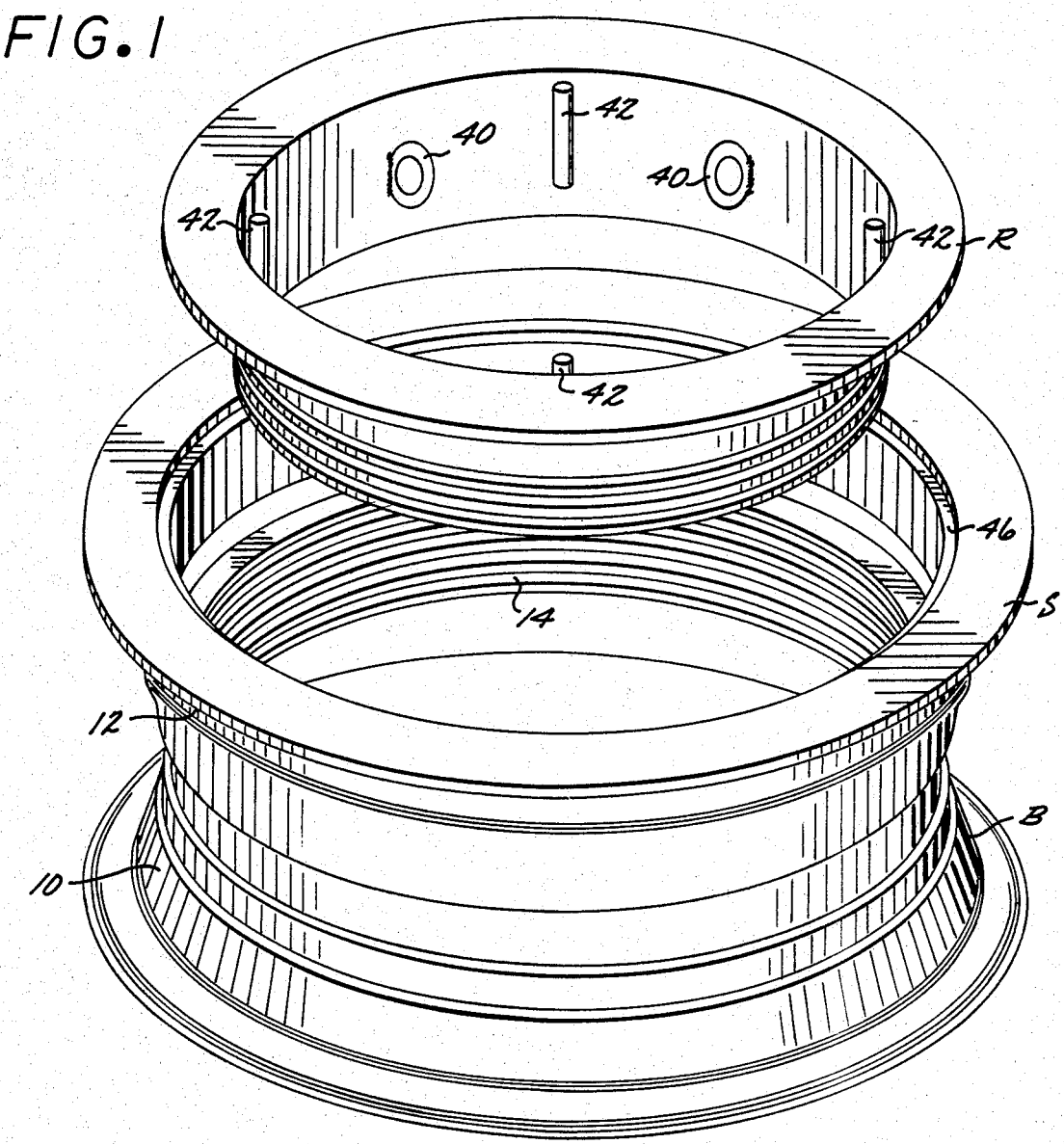
FIG. 1 is a vertically exploded perspective view of a preferred form of tire curing apparatus embodying the present invention.
Figure 2:
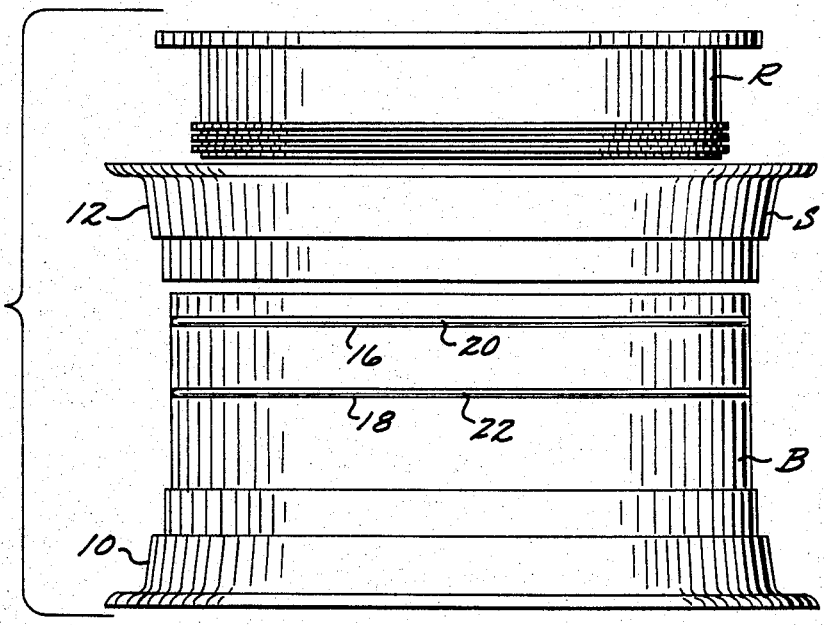
FIG. 2 is a vertically exploded side elevational view of such apparatus.
Figure 3:
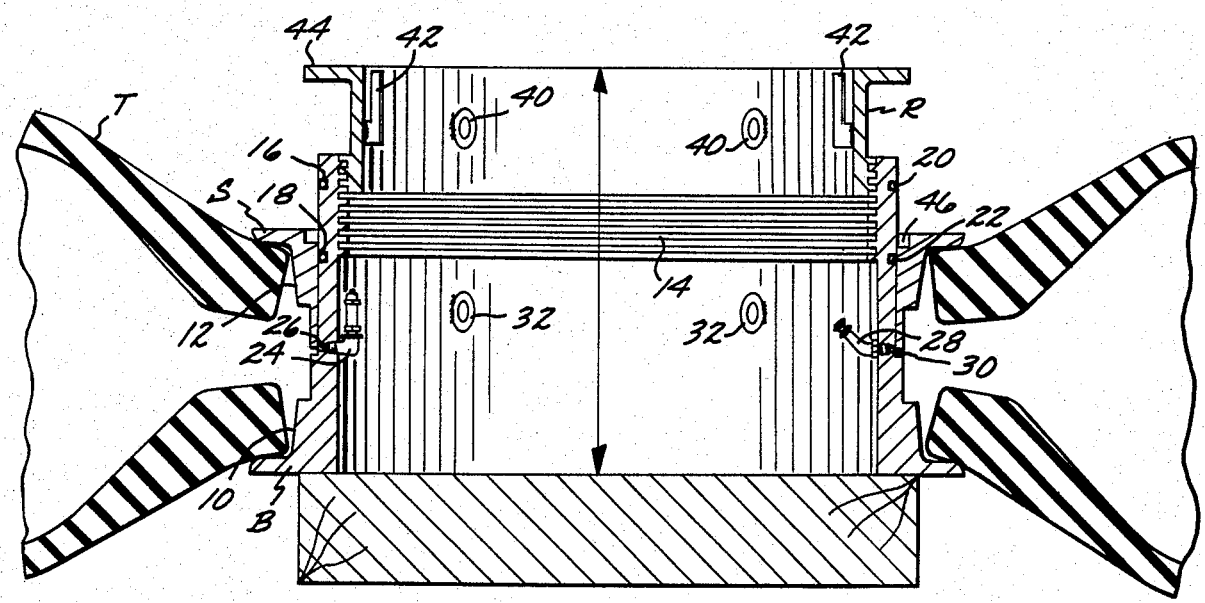
FIG. 3 is a vertical sectional view through the midportion of said apparatus, with a tire to be cured shown in its relaxed position.
Figure 4:
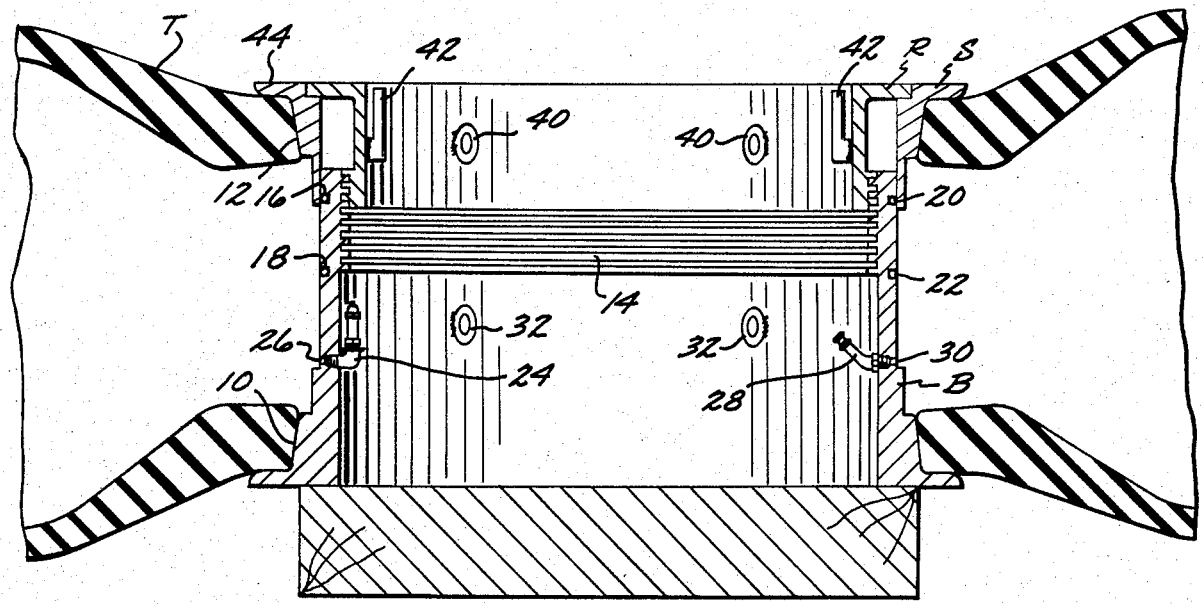
FIG. 4 is a view similar to FIG. 3 but showing the tire in its inflated condition.

Referring to the drawings, a preferred form of tire curing apparatus embodying the present invention includes a lower barrel member B, which supports at its upper portion an adjusting and locking ring R, and a floating sealing ring S telescopically slideably carried by the lower barrel B. A tire T to be cured is disposed between an upwardly facing lower sealing rim 10 formed at the lower portion of the lower barrel B and a downwardly facing upper sealing rim 12 formed on the upper portion of the floating sealing ring S. In FIG. 3 the tire T is shown in its relaxed position, while in FIG. 4 the tire T is shown after it has been inflated. It should be understood that solely the resistance of the beads of the tire against being separated maintains a seal between such tire beads and the sealing rims.

More particularly, the lower barrel B is integrally formed with the aforementioned lower sealing rim 10. The upper portion of the lower barrel member is provided with a plurality of internal threads 14. A pair of grooves 16 and 18 are formed in the outer wall of the lower barrel to receive a pair of sealing means, such as conventional O rings 20 and 22. Preferably, a pressure-relief valve 24 disposed in a port 26 connects the outer surface of the lower barrel with the interior of such barrel. An air inlet 28 is disposed in a second port 30 formed in the lower barrel. A plurality of lifting rings 32 are rigidly affixed to the interior of the lower barrel member at circumferentially spaced points thereon.

The adjusting and locking ring R is formed with an enlarged lower portion having external threads 36 complementarily engaging the threads 14 of the lower barrel B. A plurality of lifting rings 40 are rigidly affixed, as by welding, to circumferentially spaced points around the interior of the ring R. The interior of such ring R is also provided with a plurality of generally L-shaped rotation-imparting brackets 42. The upper end of the adjusting and locking ring R is formed with a radially outwardly extending flange 44 which acts as a motion limiting stop for the floating sealing ring S.

Floating sealing ring S is integrally formed with the aforementioned upper sealing rim 12. The inner surface of floating sealing ring S has a tight sliding fit with the external surface of the lower barrel B. A circumferential groove 46 is formed at the upper interior edge of floating sealing ring S to interfit with the aforementioned motion-limiting stop flange 44 of the adjusting and locking ring R.

In the operation of the aforementioned apparatus, the base of the lower barrel B will be positioned upon a block 50, or the like, to provide clearance for the underside of the tire T. The adjusting and locking ring R, as well as the floating sealing ring S are initially separate from the lower barrel whereby a tire T to be cured may be lowered around the lower barrel until its lower bead 54 rests upon the lower sealing rim 10. The beads of the tire should preferably be lubricated as with a silicone lubricant. The floating sealing ring S is then lowered onto the lower barrel until the upper sealing rim 12 sealingly contacts the upper tire bead 56. Next, the adjusting and locking ring R is lowered into position, as by means of a crane (not shown) connected to chains having hooks temporarily engaged with the upper lifting rings 40. The adjusting and locking ring R is rotated so as to be threaded downwardly into the confines of the upper portion of the lower barrel B. Such rotation may be imparted by pipes (not shown) lowered over brackets 42. The desired tire bead cure width is then measured by measuring the overall heighth from the bottom of the lower barrel to the top of the adjusting and locking ring R. This measurement may be taken inside the lower barrel. The adjustment in heighth is made by rotating the adjusting and locking ring R until the measured overall heighth of the lower barrel B and the adjusting and sealing ring R is a predetermined distance longer than the desired tire bead width for the size of the tire T being cured.

After the tire bead width adjustment has been made, the tire T is inflated by means of the air fitting 28. Such inflation causes the tire to expand from its relaxed condition of FIG. 3 to its inflated position of FIG. 4. It should be particularly noted that this inflation of the tire causes the tire beads 54 and 56 to initially seat against the lower and upper sealing rims 10 and 12, respectively. As the tire expands, it will urge floating sealing ring S upwardly until such ring engages the stop flange 44. In this manner, accurate control of the bead width of the tire being cured is assured. Thereafter, the air is bled from within the tire T and the assembly of tire and lower barrel B, adjusting and locking R and sealing ring S is positioned within a tire curing unit. During this period, the initial seal between the tire beads and the sealing rims remains intact. With the seal still intact, the tire is again inflated utilizing the air fitting 28 and the tire curing operation takes place. At the end of such curing operation, the aforementioned assembly is removed from the tire curing unit, tire T is deflated, the rings R and S are removed from the lower barrel, and the cured tire is lifted from the lower barrel.

The tire curing apparatus described hereinbefore is economical of construction, simple of design, and rugged of construction so as to provide a long, trouble-free service life. The time required to mount and dismount the tire to be cured is less than conventional devices since the parts thereof are easily assembled and disassembled. Adjustment of tire bead width is readily effected without the use of spacers or other extraneous parts. A positive tire seal during the curing operation is provided for all off-the-road tire sizes and molds.

Various modifications and changes may be made with respect to the foregoing detailed description without departing from the spirit of the present invention.

I claim:

1. Apparatus usable within a tire mold for curing tubeless tires having varying bead-to-bead spacing, said apparatus comprising:
   a lower barrel formed at its bottom portion with an upwardly facing sealing rim for engagement with the lower bead of the tire to be cured;
   an adjusting and locking ring axially telescopically disposed at the upper portion of said lower barrel and formed with a motion-limiting stop;
   a floating sealing ring telescopically slideably carried by said lower barrel, the upper portion of said sealing ring being formed with a downwardly facing sealing rim, and with upward movement of said sealing ring being limited by engagement with the motion-limiting stop of said adjusting and locking ring, said sealing ring initially being disposed at the intermediate portion of said lower barrel with its sealing rim in engagement with the upper bead of said tire;
   air supply means extending through said lower barrel for inflating said tire whereby the beads thereof effect upward movement of said floating sealing ring with solely the resistance of the beads against being separated maintaining a seal between said beads and said sealing rims;
   seal means interposed between said lower barrel and said floating sealing ring for sealing the interior of said tire with respect to said lower barrel and said floating sealing ring when said tire is inflated; and
   adjustable stop means interposed between said lower barrel and said adjusting and locking ring to adjust the axial distance of separation of said sealing rims when said tire is inflated to thereby control the bead-to-bead spacing of the tire being cured, said adjustable stop means including complementary thread means formed on the inner surface of the upper portion of said lower barrel and the outer surface of said adjusting and locking ring.

2. Apparatus as set forth in claim 1, wherein said seal means includes grooves and O-rings.

3. Apparatus as set forth in claim 2, wherein said stop means includes a flange stop formed on said adjusting and locking ring that is engaged by said floating and sealing ring.

4. Apparatus as set forth in claim 1, wherein said stop means includes a flange stop formed on said adjusting and locking ring that is engaged by said floating and sealing ring.

5. Apparatus usable within a tire mold for curing tubeless tires having varying bead-to-bead spacing, said apparatus comprising;
   an integral lower barrel formed at its bottom portion with an upwardly facing sealing rim for engagement with the lower bead of the tire to be cured, and with the upper and intermediate portions of said barrel being of uniform outside diameter;
   an adjusting and locking ring axially telescopically disposed at the upper portion of said lower barrel and formed with a motion-limiting stop;
   a floating sealing ring telescopically slideably carried by the upper and intermediate portions of said lower barrel, the upper portion of said sealing ring being formed with a downwardly facing sealing rim, and with upward movement of said ring being limited by engagement with said stop, said sealing ring initially being disposed at the intermediate portion of said lower barrel with its sealing rim in engagement with the upper bead of said tire, and with the height of said sealing ring being less than the height of the combined upper and intermediate portions of said lower barrel;
   air supply means extending through said lower barrel for inflating said tire whereby the beads thereof effect upward movement of said floating sealing ring with solely the resistance of the beads against being separated maintaining a seal between said beads and said sealing rims;
   seal means interposed between said lower barrel and said floating sealing ring for sealing the interior of said tire with respect to said lower barrel and said floating sealing ring when said tire is inflated; and adjustable stop means interposed between said lower barrel and said adjusting and locking ring to adjust the axial distance of separation of said sealing rims when said tire is inflated to thereby control the bead-to-bead spacing of the tire being cured, said adjustable stop means including complementary thread means formed on the inner surface of the upper portion of said lower barrel and the outer surface of said adjusting and locking ring.

* * * * *